March 16, 1971 G. GUINOT 3,570,153
MACHINES OF THE TYPE COMPRISING A TRACTOR AND
A BASE, NOTABLY EARTHWORKING MACHINES
Filed Feb. 26, 1969 2 Sheets-Sheet 1
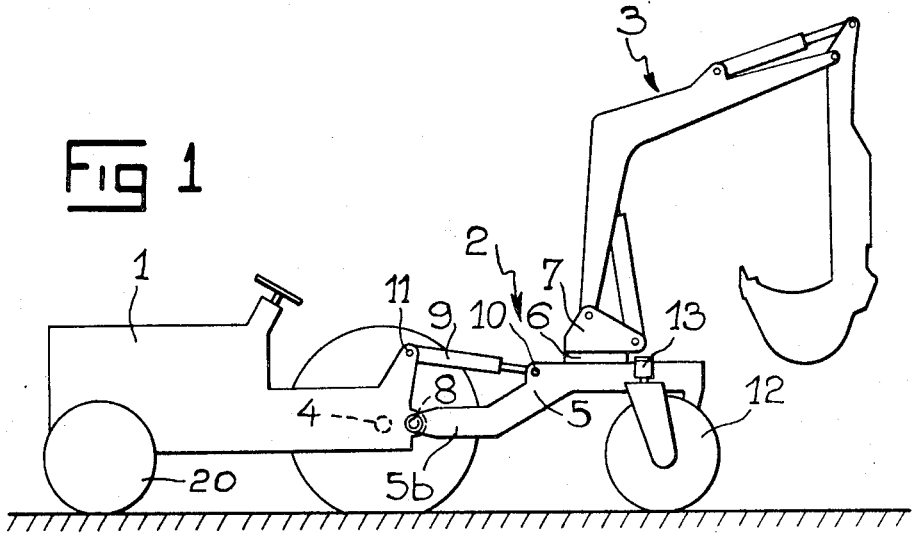
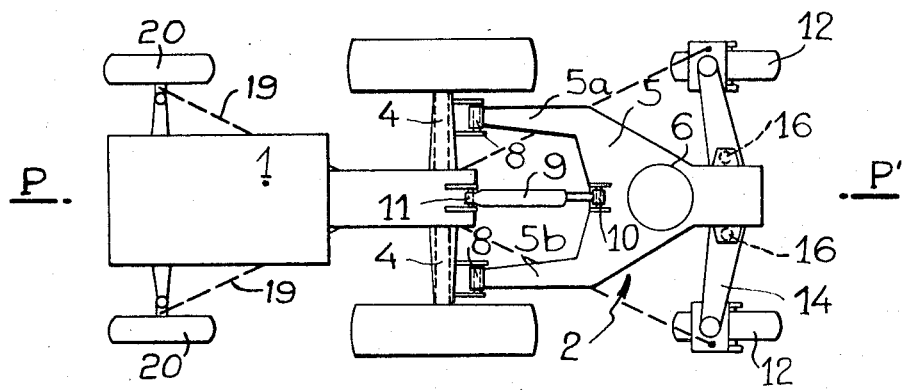
*Inventor*
GABRIEL L. GUINOT
By Mason, Fenwick & Lawrence
*Attorneys*

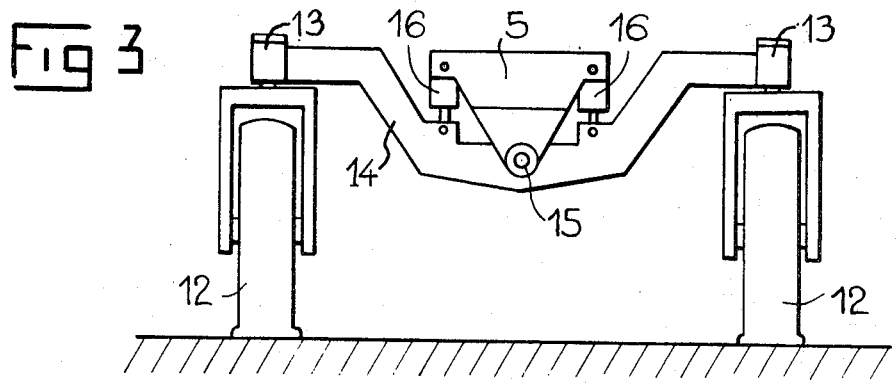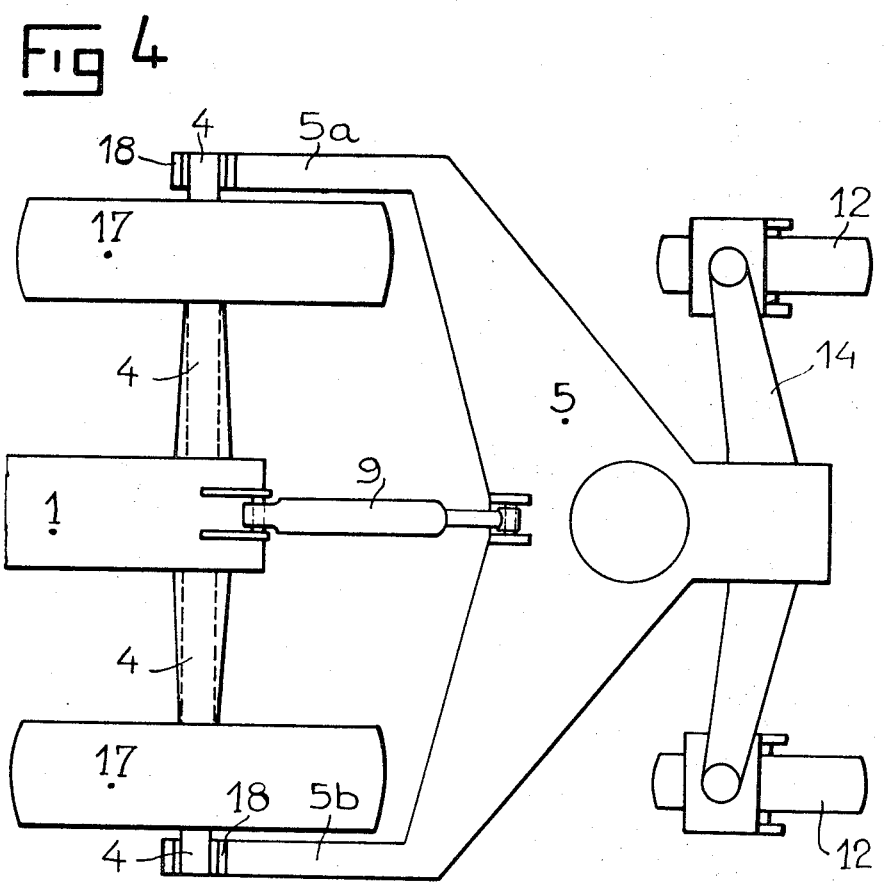

United States Patent Office 3,570,153
Patented Mar. 16, 1971

3,570,153
MACHINES OF THE TYPE COMPRISING A TRACTOR AND A BASE, NOTABLY EARTHWORKING MACHINES
Gabriel Guinot, Le Plessis-Belleville, France, assignor to Societe Anonyme Poclain, Le Plessis-Belleville, France
Filed Feb. 26, 1969, Ser. No. 802,597
Int. Cl. A01b 69/00, 63/22; E02f 5/02
U.S. Cl. 37—103                                             5 Claims

ABSTRACT OF THE DISCLOSURE

A public works machine having a tractor, a base including a chassis articulated on the tractor about at least one shaft parallel to the rear axle of the tractor, and working equipment mounted to pivot on the chassis. The chassis is articulated on a cross-beam provided with two wheels, preferably free to rotate about a substantially horizontal shaft and situated in the median longitudinal plane of the tractor. The chassis may be clamped as desired with respect to the cross-beam and the tractor.

---

Earthworking or handling machines of the type comprising a tractor and a base for the working tools are already known.

Thus, in public works, shovels are used which are mounted on a chassis resting on the one hand on a fixed axle and, on the other hand, on the hook connecting the base and the tractor.

Machines of this type are also used for agricultural purposes, and consist in a tractor and a chassis for the tools, attached to the tractor and provided with freely rotating wheels.

These machines however have important drawbacks.

The first type of machine above mentioned is difficult to operate when moving backwards and has a poor stability. As to the machine used for agricultural works, it is obviously not adapted for earthworking or handling works.

The present invention has for its purpose a machine of the tractor and base type, particularly adapted for earthworking and handling works, having a great flexibility of use, easy to handle and very stable during operation and when moving from one place to another.

To this end, the invention has for its object a machine, notably designed for public works, of the type comprising a tractor and a base supporting the working equipment. This working equipment is adapted to pivot on the chassis of the base, and this chassis is articulated on the one hand about an approximately horizontal shaft located in the median longitudinal plane of the tractor on a cross beam supporting at least two wheels, preferably freely rotating; and, on the other hand, about a shaft parallel to the fixed axle of the tractor, on said tractor, means being provided for blocking as desired the chassis with respect to said cross beam and with respect to the tractor.

Other characteristics and advantages of the invention will result from the following description of a form of embodiment of the machine above described, this description being given solely as an example and with respect to the annexed drawing in which:

FIG. 1 is a diagrammatic view in elevation of a machine according to the invention;

FIG. 2 is a partial plane view of the machine of FIG. 1;

FIG. 3 shows the axle carrying the wheels of the base of the machine of FIGS. 1 and 2;

FIG. 4 shows an alternative embodiment of the machine of FIG. 1.

In FIGS. 1 and 2 is diagrammatically shown a tractor pulling a base 2 supporting bucket working equipment 3.

The tractor 1 includes a fixed motor axle 4 at the rear and a direction axle at the front.

The base consists in a chassis 5, on which is mounted a pivot 6 supporting a turret 7 carrying in turn equipment 3.

Chassis 5 has approximately the shape of a two arms fork 5a and 5b, the ends of which are articulated about two coaxial shafts 8, parallel to the rear axle 4, situated on each side of the differential gear (not shown), on the chassis of the tractor.

In addition, chassis 5 includes means for clamping tractor 1, consisting in a double-action jack 9, substantially disposed in the longitudinal axis of tractor 1 and articulated on the one hand on chassis 5 about an axle 10, and, on the other hand, on the chassis of tractor 1 about a second axle 11.

Chassis 5 rests on two wheels, preferably freely mounted, by means of vertical pivots 13, on a cross beam 14.

Cross-beam 14 forms (FIG. 3) a kind of cradle on which chassis 5 pivots about a shaft 15, substantially horizontal, and positioned in the median longitudinal plane P,P' of tractor 1.

The clamping of chassis 5 with respect to cross-beam 14 is obtained by two simple action or double action jacks, articulated on the one hand on chassis 5 and on the other hand on cross-beam 14, and disposed on each side of shaft 15.

When the machine is moving, the means for clamping chassis 5 with respect to tractor 1 and cross-beam 14 are not in the operative position. Thus, chassis 5 oscillates about the axis of shafts 8 and the cross beam 14 oscillates about the axis of shaft 15. The six wheels of the machine are thus constantly in contact with the ground, and in the curves, the wheels 12 automatically take the imposed direction. When equipment 3 is in operation, the jacks 9 and 16 are clamped and a rigid assembly is thus obtained, which consists of tractor 1, chassis 5 and cross-beam 14.

The above-described machine is very easy to handle, especially when moving in the backward direction. Stability at the rear of the machine is also improved, since the weight of the tractor acts as a counterweight, which permits of lightening the base 2 while reducing its length.

FIG. 4 shows an alternative form of embodiment of the articulation members of arms 5a and 5b of chassis 5 on the tractor. According to this alternative form, the arms 5a and 5b extend beyond the two rear wheels 17 of tractor 1 and are articulated directly on the external part of the rear axle through the agency of bearings 18. This arrangement has the advantage, in operation, to directly transmit to the wheels 17 the reactions of chassis 5.

In accordance with an advantageous form of embodiment, a lever and rod system 19 connects the wheels 12 of the base 2 to the direction wheels 20 of tractor 1.

Finally, the present invention is not limited to the embodiment described and represented hereinabove, but, on the contrary, covers all the alternative forms thereof. Accordingly, the chassis 5 may have a form which is different from that shown in FIGS. 1 to 4, and may be articulated on a single shaft integral with the chassis of the tractor, instead of two shafts 8. Similarly, the shape of the cross beam 14 is immaterial and may include more than two wheels, and the means for clamping the chassis with respect to the tractor and the cross beam may be different from those described, provided the same functions are obtained.

I claim:

1. Machine, notably for public works, consisting of a tractor having a rear axle, a base comprising a chassis articulated on said tractor about at least one shaft parallel to the rear axle of the tractor, and a working equipment mounted to pivot on said chassis of the base, said machine being characterized in that the chassis of the base is articulated on a cross-beam provided with two wheels, free to rotate about a shaft substantially horizontal and situated in the median longitudinal plane of said tractor, and means for clamping as desired the chassis with respect to said cross-beam and with respect to said tractor.

2. Machine according to claim 1, characterized in that said chassis of the base has the shape of a two-arm fork articulated at the ends of said arms on two coaxial shafts, integral with the chassis of said tractor and parallel to the rear axle of the latter.

3. Machine according to claim 1, characterized in that chassis of the base has the shape of a fork with two arms articulated at their forward ends on the rear axle of said tractor.

4. Machine according to claim 1 wherein said means for clamping the chassis of the base and tractor and cross beam comprises a pair of jacks articulated on the one hand on said chassis and, on the other hand, respectively on the chassis of said tractor and on said cross beam.

5. Machine according to claim 1 characterized in that the wheels of the base are connected by a lever and rod system to the tractor steering gear.

References Cited
UNITED STATES PATENTS

| | | | |
|---|---|---|---|
| 2,662,314 | 12/1953 | Lindeman et al. | 172—285X |
| 2,833,556 | 5/1958 | Kling | 280—405 |
| 2,880,894 | 4/1959 | Walker | 214—138 |
| 2,974,976 | 3/1961 | Lyall | 180—22(D)X |
| 3,184,076 | 5/1965 | Brown et al. | 180—22(D)X |
| 3,191,954 | 6/1965 | Schuetz | 280—6(H) |
| 3,349,932 | 10/1967 | Wagner | 214—138 |

ROBERT E. BAGWILL, Primary Examiner

A. E. KOPECKI, Assistant Examiner

U.S. Cl. X.R.

172—282, 316, 321, 413, 421